United States Patent [19]

Green et al.

[11] Patent Number: 4,618,370

[45] Date of Patent: Oct. 21, 1986

[54] FOAM GENERATING COMPOSITIONS

[75] Inventors: Harold A. Green, Havertown, Pa.; Morris Weinstein, Paramus, N.J.

[73] Assignee: Millmaster Onyx Group, Inc., New York, N.Y.

[21] Appl. No.: 771,628

[22] Filed: Sep. 3, 1985

[51] Int. Cl.$^4$ .......................... C04B 24/00; B32B 5/20; B01V 13/00; B29C 27/60

[52] U.S. Cl. .................................. 106/111; 106/109; 156/39; 156/43; 264/43; 252/308

[58] Field of Search ................ 106/109, 111; 156/39, 156/41, 43; 252/308; 264/43

[56] References Cited

U.S. PATENT DOCUMENTS

| | | | |
|---|---|---|---|
| 3,577,248 | 5/1971 | Doan et al. | 156/43 |
| 3,782,983 | 1/1974 | Komor | 106/88 |
| 3,912,528 | 10/1975 | Doan et al. | 156/43 |
| 4,046,582 | 9/1977 | Kawamura et al. | 106/88 |
| 4,057,443 | 11/1977 | Stiling | 156/43 |
| 4,113,638 | 9/1978 | Taylor | 106/111 |
| 4,156,615 | 5/1979 | Cukier | 106/111 |

Primary Examiner—Gary P. Straub
Attorney, Agent, or Firm—Arthur A. Jacobs

[57] ABSTRACT

The sodium and/or ammonium salts of a mixture of n-alkyl oxyethylated sulfuric acids in aqueous solution, wherein all the compounds have the same molecular formula $CH_3(CH_2)_x(OCH_2CH_2)_yOSO_3^-M^+$,
being either the sodium or ammonium cation, x being an integer from about 6 to 12, and y being an integer from about 1 to 3.5, a major portion of the mixture comprising compounds where x equals 6–8 and a minor portion of the mixture comprising compounds where x equals 10–12; these mixtures being capable of generating foam of relatively large volume and high stability.

3 Claims, No Drawings

FOAM GENERATING COMPOSITIONS

This invention relates to a composition which is capable of generating foam, and it more specifically relates to the sodium and/or ammonium salts of a synergistic mixture of n-alkyl oxyethylated sulfuric acids which may be used to generate foam of good stability, such foam being particularly adapted to facilitate the entrainment of microscopic air bubbles in the core of gypsum board during manufacture thereof.

Gypsum board is manufactured by spreading an aqueous slurry of calcined gypsum between two impervious barriers and permitting the gypsum to harden by rehydration. In addition to the calcined gypsum, other substances may be added to the slurry for various purposes. Among such additives are potassium sulfate, starch, lime, fly ash, hydrotropes, cellulosic fiber, etc. Among the effects that these additives achieve are acceleration of setting, improved viscosity, increased resistance to shock, reduction in amount of water required to produce a workable slurry, etc.

It is common practice to also incorporate microscopic air bubbles into the gypsum slurry either by adding surfactants to the slurry before or during the mixing operation or by adding externally-generated foam to the slurry.

The benefits of entraining air bubbles before the slurry hardens include:

(a) increased fluidity and workability of the slurry
(b) reduced separation of water
(c) reduced density of the hardened gypsum It appears that air bubbles separate the solid particles in the slurry, thereby making for greater fluidity. These air bubbles also separate the water droplets, thereby decelerating the rate at which water agglomorates and bleeds out. These two effects reduce the amount of water required for making an acceptable slurry. Furthermore, because of their own low density, the air bubbles, upon incorporation into the slurry, reduce the overall density of the resultant hardened gypsum core.

It has long been known that the entrainment of air bubbles in cement and mortar is desirable for various reasons including the reduction of the amount of water required to make an acceptable cement or mortar slurry. Among the many surfactants heretofore used for generating foam for incorporation into cement and mortar slurries are the sodium and ammonium salts of n-alkyl oxyethylated sulfuric acids (U.S. Pat. No. 3,782,983) and the sodium and ammonium salts of branched alkyl oxyethylated sulfuric acids (U.S. Pat. No. 4,046,582).

One of the foaming agents of U.S. Pat. No. 3,782,983, may be represented by the formula $CH_3(CH_2)_xCH_2(OCH_2CH_2)_yOSO_3^-M^+$ where the preferable compounds are those in which x is 6–8, and y has an average value between 1 and 3, $M^+$ being either the sodium or ammonium cation. That patent also discloses that compounds in which x is 10–12 are distinctly inferior foaming agents and are therefore not included in the invention.

U.S. Pat. No. 4,156,615 teaches that the same compounds described in U. S. Pat. No. 3,782,983 for use in cement and mortar slurries are useful as good foaming agents in the manufacture of gypsum board. It discloses that compounds of formula $CH_3(CH_2)_xCH_2(OCH_2CH_2)_yOSO_3^-M^+$, in which x is 6 or 8, y has an average value of 2, and $M^+$, is either sodium or ammonium cation, generate foam for incorporation into gypsum slurries. This patent also discloses that compounds in which x is either 10 or 12 are inferior foamers, and specifically excludes them from the invention therein.

In accordance with the present invention, it has been discovered that when small amounts of poorer foaming surfactants having the formula $CH_3(CH_2)_xCH_2(OCH_2CH_2)_yOSO_3^-M^+$, wherein x is 10–12 and y has an average value of about 1–3, replace a similar quantity of compounds of the same general formula, in which x is 6–8 and y has an average value of about 2 to 3 (which are high foamers), they improve the foam generating ability of the latter compounds so that the mixture, on a weight for weight basis, generates more foam than the better foaming compounds alone in which x is 6–8.

The most preferable composition for the present purposes is one wherein the ratio of the combined weight of the compounds in which x equals about 6 to 8 to the combined weight of the compounds in which x equals about 10 to 12 is from about 2:1 to about 8:1, wherein the ratio of the weight of the compounds in which x equals about 6 to the weight of the compounds in which x equals about 8 is about 1:1, and wherein the ratio of the weight of the compounds in which x equals about 10 to the weight of the compounds in which x equals about 12 is from about 3:1 to about 1:3.

This is quite surprising inasmuch as it was found that the compounds in which x is 10–12 and y is about 1–3 are decidedly poor foam generators compared to their homologs in which x is 6–8.

The efficacy of a surfactant as an air entraining agent depends on two properties: (a) its ability to produce copious volumes of foam and (b) the stability of the foam during processing. The generally used method of estimating these properties is as follows:

EXAMPLE 1

About 8 ounces of gypsum is poured into a 5 gallon jar almost filled with water and the contents of the jar are mixed with a small "Lightning" mixer for about 15 to 30 minutes. Then the mixture is allowed to settle overnight. The supernatant liquid constitutes a saturated gypsum solution which is used as the diluent for all foam testing.

To almost 100 ml. of saturated gypsum solution is added the solid solute surfactant material that has been accurately weighed, and the solution is brought up to a volume of 100 ml. with the diluent. However, since the surfactant is generally not available in pure solid form but in the form of concentrated aqueous solutions having from about 25% to about 75% of pure active surfactant by weight, this may be used in place of the solid material. In such instance, some of the concentrated solution is diluted with diluent so that the dilute solution contains exactly 10% of active material by weight. Just enough of this diluted solution is pipetted into about 50 ml. of saturated gypsum solution so that the weight of active material is exactly equal to the desired weight of surfactants. The solution is then brought up to 100 ml. with diluent. The solution to be tested must contain at least 95% by volume of the diluent consisting of the saturated gypsum solution, and no more than 5% by volume of water, preferably less. In this manner, 100 ml. of test solution is prepared from either the pure solid surfactants, or the concentrated solutions of surfactants.

The test solution is placed in a 1-liter bowl of a "Waring Blender" (Model LAH, single speed), the bowl having been graduated previously in 25 ml. increments up to 1000 ml. and the mixer is activated at exactly the same time that a timer is started.

After exactly 60 seconds of mixing, the mixer is deactivated but the timer is permitted to run. The volume of foam is noted to the nearest 25 ml. mark.

When the mixing is stopped, the foam begins to break and liquid begins to drain to the bottom of the bowl. When exactly 50 ml. of liquid has drained to the bottom of the bowl, the timer is stopped and the time is noted. The number of seconds it takes for 50 ml. of liquid to drain to the bottom is known as the half-life of the foam. This is equal to the total elapsed time less 60 seconds.

Although the testing of the surfactant blends of this invention was performed when they were dissolved in concentrated gypsum solution, the invention is not limited to concentrated gypsum solutions but covers aqueous solutions of the blends, generally. The reason for testing the blends in concentrated gypsum solutions is that when aqueous slurrys of the blends and calcined gypsum are made during the manufacture of wallboard, the solution becomes saturated with respect to gypsum; consequently the efficacy of the blends are tested in concentrated gypsum solutions in order to duplicate, as far as possible, the actual manufacturing conditions. The same applies when an aqueous foam containing the blends of this invention is added to a gypsum slurry.

In order to determine the parameters of this invention, mixtures of the salts of several n-alkyl polyoxyethylsulfuric acids were tested. The total concentrations of all active material in the test solutions were set at 0.13%, 0.22%, 0.33% and 0.45% because the concentrations at which these materials are used in wallboard manufacture usually lie between 0.1% and 0.5%. It appears, however, that higher concentrations will show similar properties.

All the materials that were tested have the general molecular formula $CH_3(CH_2)_xCH_2(OCH_2CH_2)_yOSO_3^-M^+$, so that they can be identified merely by the integers x and y, and the identity of the cation $M^+$.

The following Table 1 shows the foam volumes after mixing for 60 seconds and total elapsed time in seconds until 50 ml. of liquid has drained from the foam. (The half life of the foam can be computed by subtracting 60 seconds from the total elapsed time). In the table the number preceding the slash represents the foam volume; the number after the slash represents the total elapsed time. The table shows the quantitative results of several different blends of alkyl oxyethylated sulfuric acid salts:

TABLE 1

| Material Tested | Total Concentration Of Active Material In Test Solution | | | |
|---|---|---|---|---|
| | 0.13% | 0.22% | 0.33% | 0.45% |
| A. x = 6 (about 50%)<br>x = 8 (about 50%)<br>y = 2 (average)<br>ammonium salt | | 500/157 | 600/195 | 650/221 |
| B. x = 6 (about 50%)<br>x = 8 (about 50%)<br>y = 3 (average)<br>ammonium salt | 400/157 | 500/172 | 600/214 | 650/228 |
| C. x = 6 (about 50%)<br>x = 8 (about 50%)<br>y = 3 (average)<br>sodium salt | 450/164 | 550/212 | 600/220 | 650/226 |
| D. x = 10 (about 67%)<br>x = 12 (about 33%)<br>y = 1¼ (average)<br>ammonium salt | 250/95 | 300/112 | 325/113 | 350/120 |

TABLE 1-continued

| Material Tested | Total Concentration Of Active Material In Test Solution | | | |
|---|---|---|---|---|
| | 0.13% | 0.22% | 0.33% | 0.45% |
| E. x = 10 (about 33%)<br>x = 12 (about 67%)<br>y = 1¼ (average)<br>ammonium salt | 250/95 | 275/113 | 300/120 | 325/122 |
| F. x = 10 (about 67%)<br>x = 12 (about 33%)<br>y = 3 (average)<br>ammonium salt | 250/95 | 275/113 | 300/122 | 325/129 |

Test B in Table 1 shows that when a mixture containing about 50% of the compound in which x=6 and y=3 and about 50% of the compound in which x=8 and y=3, the cation being ammonium, was tested at total concentrations of 0.13%—i.e. 0.065% (x=6) and 0.065% (x=8)—as well as at total concentrations of 0.22%, 0.33% and 0.45%, the foam volumes after 60 seconds were 400 ml., 500 ml., 600 ml., and 650 ml. respectively, and the total elapsed time until 50 ml. of liquid has drained from the foam were 157 sec., 172 sec., 214 sec and 228 sec. respectively.

The tests A through F show clearly and distinctly that the blends in which x=6 and x=8, y being 2 or 3, are much better foaming agents (i.e. yield larger volume of foam) and are much more stable (i.e. have greater half life), whether y=2 (average) or 3 (average), then those blends in which x=10, and x=12 (whether y=1¼ or 3 (average) at all concentrations used in the tests. In other words, blends A, B, and C, which represent mixtures of compounds in which x=6 and/or =8, are the higher foaming blends. Blends D, E and F, which represent mixtures in which x=10 and/or 12, are the lower foaming blends.

The following Table 2 shows the foam volumes and total elapsed times of mixtures of high foaming blends with low foaming blends, i.e. mixtures of either A, B, or C with either D, E or F.

TABLE 2

| Material Tested | Total Concentration In Test Solution | | | |
|---|---|---|---|---|
| | 0.13% | 0.22% | 0.33% | 0.45% |
| I. A:D = 7:1 | 450/138 | 550/178 | 650/205 | 750/221 |
| II. B:D = 7:1 | 450/145 | 550/207 | 700/230 | 800/245 |
| III. B:E = 7:1 | 450/145 | 550/200 | 650/220 | 775/230 |
| IV. B:D = 3:1 | 450/165 | 600/205 | 750/213 | 800/230 |
| V. B:E = 3:1 | 450/157 | 550/210 | 700/223 | 775/232 |
| VI. C:D = 7:1 | 450/164 | 550/210 | 700/223 | 775/223 |
| VII. C:E = 3:1 | 450/164 | 600/200 | 750/213 | 800/232 |
| VIII. B:F = 7:1 | 400/157 | 525/192 | 625/220 | 650/241 |
| IX. B:F = 4:1 | 400/150 | 500/192 | 600/223 | 650/243 |
| X. B:F = 2:1 | 375/145 | 475/182 | 550/210 | 600/247 |
| XI. C:F = 4:1 | 400/152 | 500/184 | 625/222 | 650/245 |

Test II of Table 2 shows that a mixture of 7 parts of blend B with 1 part of blend D, at total concentrations of 0.13%, 0.22%, 0.33% and 0.45%, respectively, produce foam volumes of 450 ml., 550 ml., 700 ml. and 800 ml. respectively, and have half-lives of 145 sec., 207 sec., 230 sec., and 245 sec. respectively.

Since B is a 50/50 blend by weight of compounds where x=6 and x=8, y being 3, in the presence of ammonium salts, and D is a blend of 2 parts of compounds where x=10, and 1 part of compounds where x=12, y being 1¼, in the presence of ammonium salts, and since the ratio of B:D is 7:1, then at a total concentration of 0.13%, the concentration of A is 0.114%, where 0.057% is x=6 and 0.057% where x=8, while the concentration of D is 0.016%, 0.011% thereof being compounds where x=10 and 0.005% being compounds where x=12.

Table 2 demonstrates clearly that there is some synergistic activity between the low foaming compounds (Blends D, E and F) and the high foaming compounds (Blends A, B, and C) with respect to foam generation.

Tests I through VII show that when about 12 1/2% to about 25% of the lower foaming compounds in which y=about 1¼ replaces an identically similar amount of higher foaming compounds, a larger volume of foam is generated in the test. In other words, lower foaming compounds can *enhance* the foaming properties of the higher foamers by replacing them in a mixture.

Similarly, tests VIII to XI show that when about 12½% to about 33⅓% of lower foaming compounds in which y=about 3 replaces an identically similar amount of higher foaming compound, the volume of foam generated and the stability of the foam does not decrease. In other words, replacement of even 25 and 33% of higher foamers by low foamers, does not diminish either the volume of generated foam, or its stability.

The actual concentration of each of the components in the mixtures of Table 2 are shown in the following Table 3:

TABLE 3 x = average value of interger x in general molecular formula
y = average value of interger y in general molecular formula
$M^+$ = cation in general molecular formula

| | x | y | $M^+$ | .13% | 0.22% | 0.33% | 0.45% |
|---|---|---|---|---|---|---|---|
| I. | 6 | 2 | $NH_4^+$ | .057 | .096 | .145 | .197 |
| | 8 | 2 | $NH_4^+$ | .057 | .096 | .145 | .197 |
| | 10 | 1¼ | $NH_4^+$ | .010 | .019 | .026 | .038 |
| | 12 | 1¼ | $NH_4^+$ | .006 | .009 | .014 | .018 |
| | | | | .130 | .220 | .330 | .450 |
| II. | 6 | 3 | $NH_4^+$ | .057 | .096 | .145 | .197 |
| | 8 | 3 | $NH_4^+$ | .057 | .096 | .145 | .197 |
| | 10 | 1¼ | $NH_4^+$ | .010 | .019 | .026 | .038 |
| | 12 | 1¼ | $NH_4^+$ | .006 | .009 | .014 | .018 |
| | | | | .130 | .220 | .330 | .450 |
| III. | 6 | 3 | $NH_4^+$ | .057 | .096 | .145 | .197 |
| | 8 | 3 | $NH_4^+$ | .057 | .096 | .145 | .197 |
| | 10 | 1¼ | $NH_4^+$ | .006 | .009 | .014 | .018 |
| | 12 | 1¼ | $NH_4^+$ | .010 | .019 | .026 | .038 |
| | | | | .130 | .220 | .330 | .450 |
| IV. | 6 | 3 | $NH_4^+$ | .049 | .083 | .124 | .169 |
| | 8 | 3 | $NH_4^+$ | .049 | .083 | .124 | .169 |
| | 10 | 1¼ | $NH_4^+$ | .021 | .036 | .054 | .074 |
| | 12 | 1¼ | $NH_4^+$ | .011 | .018 | .028 | .038 |
| | | | | .130 | .220 | .330 | .450 |
| V. | 6 | 3 | $NH_4^+$ | .049 | .083 | .124 | .169 |
| | 8 | 3 | $NH_4^+$ | .049 | .083 | .124 | .169 |
| | 10 | 1¼ | $NH_4^+$ | .011 | .018 | .028 | .038 |
| | 12 | 1¼ | $NH_4^+$ | .021 | .036 | .054 | .074 |
| | | | | .130 | .220 | .330 | .450 |
| VI. | 6 | 3 | $Na^+$ | .057 | .096 | .145 | .197 |
| | 8 | 3 | $Na^+$ | .057 | .096 | .145 | .197 |
| | 10 | 1¼ | $NH_4^+$ | .010 | .019 | .026 | .038 |
| | 12 | 1¼ | $NH_4^+$ | .006 | .009 | .014 | .018 |
| | | | | .130 | .220 | .330 | .450 |
| VII. | 6 | 3 | $Na^+$ | .049 | .083 | .124 | .169 |
| | 8 | 3 | $Na^+$ | .049 | .083 | .124 | .169 |
| | 10 | 1¼ | $NH_4^+$ | .011 | .018 | .028 | .038 |
| | 12 | 1¼ | $NH_4^+$ | .021 | .036 | .054 | .074 |
| | | | | .130 | .220 | .330 | .450 |
| VIII. | 6 | 3 | $NH_x^+$ | .057 | .096 | .145 | .197 |
| | 8 | 3 | $NH_4^+$ | .057 | .096 | .145 | .197 |
| | 10 | 3 | $NH_4^+$ | .010 | .019 | .026 | .038 |
| | 12 | 3 | $NH_4^+$ | .006 | .009 | .014 | .018 |
| | | | | .130 | .220 | .330 | .450 |
| IX. | 6 | 3 | $NH_4^+$ | .052 | .090 | .132 | .180 |
| | 8 | 3 | $NH_4^+$ | .052 | .090 | .132 | .180 |
| | 10 | 3 | $NH_4^+$ | .017 | .030 | .044 | .060 |
| | 12 | 3 | $NH_4^+$ | .009 | .015 | .022 | .030 |
| | | | | .130 | .220 | .330 | .450 |
| X. | 6 | 3 | $NH_4^+$ | .043 | .074 | .110 | .150 |
| | 8 | 3 | $NH_4^+$ | .043 | .074 | .110 | .150 |
| | 10 | 3 | $NH_4^+$ | .029 | .048 | .073 | .100 |

TABLE 3-continued x = average value of interger x in general molecular formula
y = average value of interger y in general molecular formula
$M^+$ = cation in general molecular formula

| | x | y | $M^+$ | .13% | 0.22% | 0.33% | 0.45% |
|---|---|---|---|---|---|---|---|
| | 12 | 3 | $NH_4^+$ | .015 | .024 | .037 | .050 |
| | | | | .130 | .220 | .330 | .450 |
| XI. | 6 | 3 | $NH_4^+$ | .052 | .088 | .132 | .180 |
| | 8 | 3 | $NH_4^+$ | .052 | .088 | .132 | .180 |
| | 10 | 3 | $NH_x^+$ | .017 | .029 | .044 | .060 |
| | 12 | 3 | $NH_4^+$ | .009 | .015 | .022 | .030 |
| | | | | .130 | .220 | .330 | .450 |

The solutions for tests II and IV were also prepared by alternative methods as follows:

EXAMPLE 2

8 parts by weight of solution P (containing about 55% active material, of which about 27½% was the compound in which x=6, y=3 (average), and $M^+$=ammonium, and about 27½% was the compound in which x=8, y=3 (average), and $M^+$=ammonium) were mixed with 2.33 parts by weight of solution Q (containing about 27% active material, of which about 18% was the compound in which x=10, y=1¼ (average) and $M^+$=ammonium, and about 8% was the compound in which x=12, y=1¼ (average) and $M^+$=ammonium, thereby making an aqueous mixture containing a total of about 49% active material in which the ratios of active material in solution P to solution Q is 7:1. From this aqueous mixture were pipetted aliquots from which were prepared solutions in diluent containing total actives of 0.13%, 0.22%, 0.33% and 0.45%. One hundred ml. of each of these diluted solutions was subjected to the foam test. The results were almost identical with the results of test II, being 450/150, 550/215, 700/235 and 800/245 respectively for the concentrations.

EXAMPLE 3

3 parts by weight of solution P (defined above) and 2 parts by weight of solution Q (defined above) were mixed, thereby making an aqueous mixture containing about 44% total active material in which the ratio by weight of the active material in solution P to solution Q is 3:1. From this aqueous mixture were pipetted aliquots from which were prepared solutions in diluent containing total active material of 0.13%, 0.22%, 0.33% and 0.45%. One hundred ml. of each of these diluted solutions was subjected to the foam test. The results were almost identical with the results of test IV, being 450/170, 600/210, 750/220 and 800/230 respectively.

The invention claimed is:

1. A composition comprising a salt of a mixture of n-alkyl oxyethylated sulfuric acids, the salt being selected from the group consisting of sodium salt, ammonium salt and mixtures thereof, all of said salts having the formula $CH_3(CH_2)_x(OCH_2CH_2)_yOSO_2^-M^+$, being either the sodium or ammonium cation, x being an integer from about 6 to 12 and y being an integer of about 1 to 3.5, a major portion of said mixture consisting of those compounds in which x equals about 6 to 8 and a minor portion of said mixture consisting of those salts in which x equals about 10 to 12, wherein the ratio of the combined weight of the compounds in which x equals about 6 to 8 to the combined weight of the compounds in which x equals about 10 to 12 is from about 2:1 to about 8:1, wherein the ratio of the weight of the compounds in which x equals about 6 to the weight of the compounds in which x equals about 8 is about 1:1, and wherein the ratio of the weight of the compounds in which x equals about 10 to the weight of the compounds in which x equals about 12 is from about 3:1 to about 1:3.

2. The composition of claim 1 in aqueous solution.

3. The aqueous solution of claim 2 wherein the total concentration of said composition in the solution is from about 0.1% to about 50% by weight.

* * * * *